US011185737B2

(12) United States Patent
Firmin

(10) Patent No.: US 11,185,737 B2
(45) Date of Patent: Nov. 30, 2021

(54) FIXED-ELEMENT DIGITAL-OPTICAL MEASURING DEVICE

(71) Applicant: Ocula Corporation, Kensington, CA (US)

(72) Inventor: Robert L Firmin, Kensington, CA (US)

(73) Assignee: Ocula Corporation, Kensington, CA (US)

(*) Notice: Subject to any disclaimer, the term of this patent is extended or adjusted under 35 U.S.C. 154(b) by 0 days.

(21) Appl. No.: 17/223,228

(22) Filed: Apr. 6, 2021

(65) Prior Publication Data

US 2021/0225021 A1    Jul. 22, 2021

Related U.S. Application Data

(63) Continuation of application No. PCT/US2019/055066, filed on Oct. 7, 2019, which is
(Continued)

(51) Int. Cl.
*G06T 7/593* (2017.01)
*G06T 7/246* (2017.01)
(Continued)

(52) U.S. Cl.
CPC ........ *A63B 24/0062* (2013.01); *G01B 11/026* (2013.01); *G06T 7/248* (2017.01);
(Continued)

(58) Field of Classification Search
CPC ........... G06T 7/593; G06T 7/74; G06T 7/571; G06T 7/248; G06T 2207/20084; G06T 2207/10012; H04N 13/218; H04N 13/239
(Continued)

(56) References Cited

U.S. PATENT DOCUMENTS 3,558,228 A   1/1971 Hodges
3,817,621 A   6/1974 Kester
(Continued)

FOREIGN PATENT DOCUMENTS

JP   2003125426 A   4/2003
WO   2009096520 A1   8/2009

OTHER PUBLICATIONS

Boynton, C, et al., "An Underwater Digital Stereo Video Camera for Fish Population Assessment", [retrieved Mar. 6, 2019]; Retrieved from the Internet.
(Continued)

*Primary Examiner* — Susan E. Hodges
(74) *Attorney, Agent, or Firm* — United IP Counselors, LLC

(57) ABSTRACT

Fixed-element, digital-optical measuring devices are disclosed, as are methods for using these devices. The measuring devices have two separate optical pathways with fixed elements that produce a stereo image. The optical pathways may include mirrors, prisms, beam splitters, and other such elements, or two digital sensors may be used. Image distance between stereo copies of a point of interest in the stereo image is measured digitally and converted to a physical distance from the measuring device. The conversion may be done with a non-trigonometric function, such as a function created using empirical data. In some cases, the function may be a function-of-functions that provides a calibration for a number of different lens focal lengths.

22 Claims, 11 Drawing Sheets

Related U.S. Application Data a continuation-in-part of application No. PCT/US2019/012447, filed on Jan. 6, 2019.

(60) Provisional application No. 62/767,510, filed on Nov. 14, 2018, provisional application No. 62/742,438, filed on Oct. 7, 2018, provisional application No. 62/614,461, filed on Jan. 7, 2018.

(51) Int. Cl.
| | |
|---|---|
| *G06T 7/571* | (2017.01) |
| *G06T 7/73* | (2017.01) |
| *H04N 13/218* | (2018.01) |
| *H04N 13/239* | (2018.01) |
| *A63B 24/00* | (2006.01) |
| *G01B 11/02* | (2006.01) |
| *A63B 69/12* | (2006.01) |
| *A63B 71/06* | (2006.01) |
| *G01P 3/38* | (2006.01) |

(52) U.S. Cl.
CPC .............. *G06T 7/571* (2017.01); *G06T 7/593* (2017.01); *G06T 7/74* (2017.01); *H04N 13/218* (2018.05); *H04N 13/239* (2018.05); *A63B 69/12* (2013.01); *A63B 71/0686* (2013.01); *G01P 3/38* (2013.01); *G06T 2207/10012* (2013.01); *G06T 2207/20084* (2013.01)

(58) Field of Classification Search
USPC .......................................................... 348/47
See application file for complete search history.

(56) References Cited

U.S. PATENT DOCUMENTS

| | | |
|---|---|---|
| 4,119,980 A | 10/1978 | Baker |
| 5,000,565 A | 3/1991 | Hughes |
| 5,136,621 A | 8/1992 | Mitchell et al. |
| 5,517,419 A | 5/1996 | Lanckton et al. |
| 5,622,422 A | 4/1997 | Rodgers |
| 9,217,634 B1 | 12/2015 | Firmin |
| 9,778,622 B2 | 10/2017 | Firmin |
| 10,501,155 B2 | 12/2019 | Firmin |
| 2005/0243651 A1 | 11/2005 | Bailey |
| 2012/0134018 A1* | 5/2012 | Frazier .................. G02B 17/08 359/434 |
| 2014/0226062 A1 | 8/2014 | Parrill |
| 2015/0245013 A1 | 8/2015 | Venkataraman et al. |
| 2016/0173833 A1 | 6/2016 | Siann et al. |
| 2017/0171456 A1* | 6/2017 | Wei ...................... H04N 13/296 |
| 2017/0178524 A1 | 6/2017 | Firmin |
| 2018/0054604 A1 | 2/2018 | Boyd et al. |
| 2018/0059679 A1 | 3/2018 | Taimouri et al. |
| 2018/0204474 A1 | 7/2018 | Firmin |

OTHER PUBLICATIONS

International Search Report issued in International Application No. PCT/US2019/12447 dated May 15, 2019.
International Search Report issued in International Patent Application No. PCT/US19/55066 dated Jan. 9, 2020.
Nevalainen, Paavo, et al., "Real-Time Swimmer Tracking on Sparse Camera Array", Springer International Publishing AG, 2017, pp. 156-174.
Written Opinion issued in International Patent Application No. PCT/US19/55066 dated Jan. 9, 2020.

* cited by examiner

FIXED-ELEMENT DIGITAL-OPTICAL MEASURING DEVICE

TECHNICAL FIELD

The invention relates to a fixed-element digital-optical measuring device.

BACKGROUND

Many methods exist for obtaining distance information. One of the older methods is optical rangefinding. Optical measuring devices are disclosed, for example, in U.S. Pat. Nos. 3,558,228; 3,817,621; and 5,000,565, all of which are incorporated by reference in their entireties. These kinds of measuring devices work by optical triangulation: an eyepiece is located at the rear of a housing, and two optical elements, usually either prisms or mirrors, are located at the front of the housing to project images toward the eyepiece in the rear of the housing. Each optical element produces a separate image, and the user rotates one or both of the optical elements until the two images converge at the eyepiece. A calibrated scale coupled to the rotational mechanism is then used to read the distance to the object.

While useful, traditional optical measuring devices are dependent on human vision and perception, and do not interface well with modern digital optical systems.

BRIEF SUMMARY

Aspects of the invention relate to fixed-element, digital-optical measuring devices, and to methods for establishing range and other range-related characteristics, such as speed or velocity.

A fixed-element, digital-optical measuring device according to one aspect of the invention has two optical paths for light to form an image. In some embodiments, each of those optical pathways is comprised of elements like prisms, mirrors, and beam-splitters that cause light to converge on a single digital sensor. In other embodiments, each of those optical pathways ends at its own digital sensor. In both cases, the elements are fixed; they do not rotate or move. In some embodiments, a zoom lens, i.e., a lens system with a plurality of focal lengths, may be placed in front of the digital sensor or sensors, while in other embodiments, zoom lenses may be placed in front of the two optical pathways. The measuring device may also include a digital viewscreen. In some embodiments, the viewscreen may be a touch screen used to select points of interest for ranging.

Another aspect of the invention relates to a method for determining the range or position of an object using the kind of measuring device described above. In this method, a mono-image of a scene is acquired and used to identify a point of interest. The point of interest is mapped to a point on a stereo image. An image distance between the point of interest and a stereo copy of the point of interest is determined, and that image distance is then converted to a physical distance between the measuring device and the point of interest. In some cases, an absolute position may be calculated using GPS or other such technologies. The conversation between image distance and physical distance is typically performed with a non-trigonometric function, and may be performed with a function created using empirical data on image distance versus physical distance. In some cases, the function may be a function-of-functions that describes the relationship for every potential focal length of the optical system, for every potential distance, or both.

Other aspects of the invention relate to apparatus and methods that derive other useful metrics from range data. For example, another method according to an aspect of the invention relates to generating data for topographical mapping applications. This method involves many of the tasks described above, except that the images that are gathered may be automatically analyzed to identify points of interest and the ranges to those points of interest determined iteratively.

As another example, a further aspect of the invention relates to an apparatus for determining the speed or velocity of an object of interest, such as a vehicle. The apparatus may be used by law enforcement, for example. This apparatus comprises a fixed-element stereo-optical system with a digital viewscreen and a pistol grip with a trigger. The viewscreen displays a digital mono-image with a reticle. The user places the reticle over the vehicle of interest and pulls the trigger to determine speed or velocity.

Other aspects, features, and advantages will be set forth in the description that follows.

BRIEF DESCRIPTION OF THE DRAWING FIGURES

DETAILED DESCRIPTION

Figure 1:
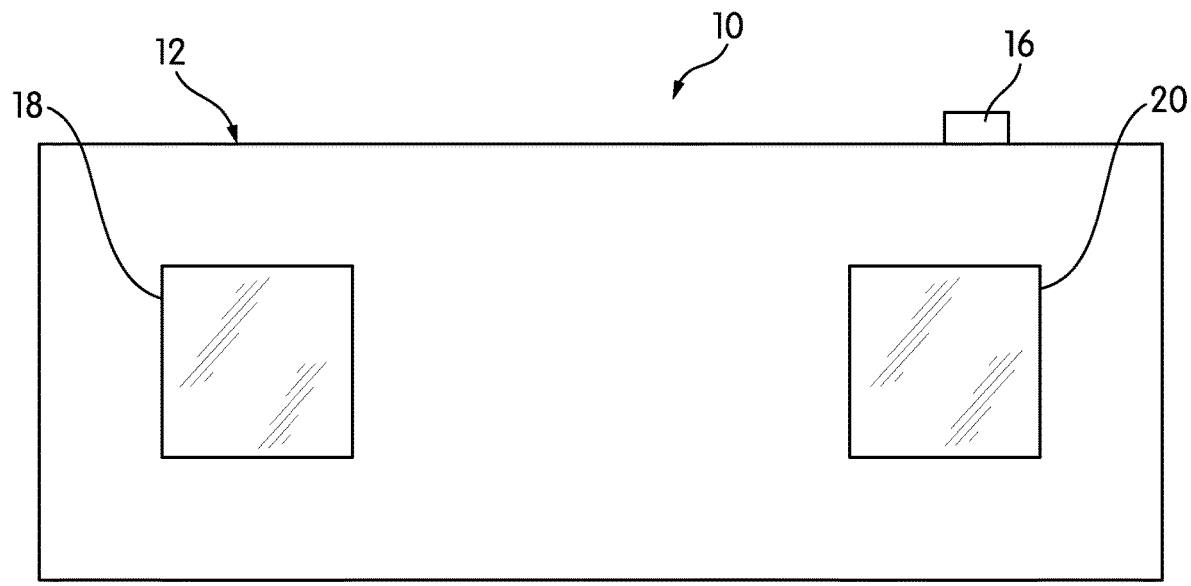
FIG. 1 is a front elevational view of a measuring device according to one embodiment of the invention.
Figure 2:
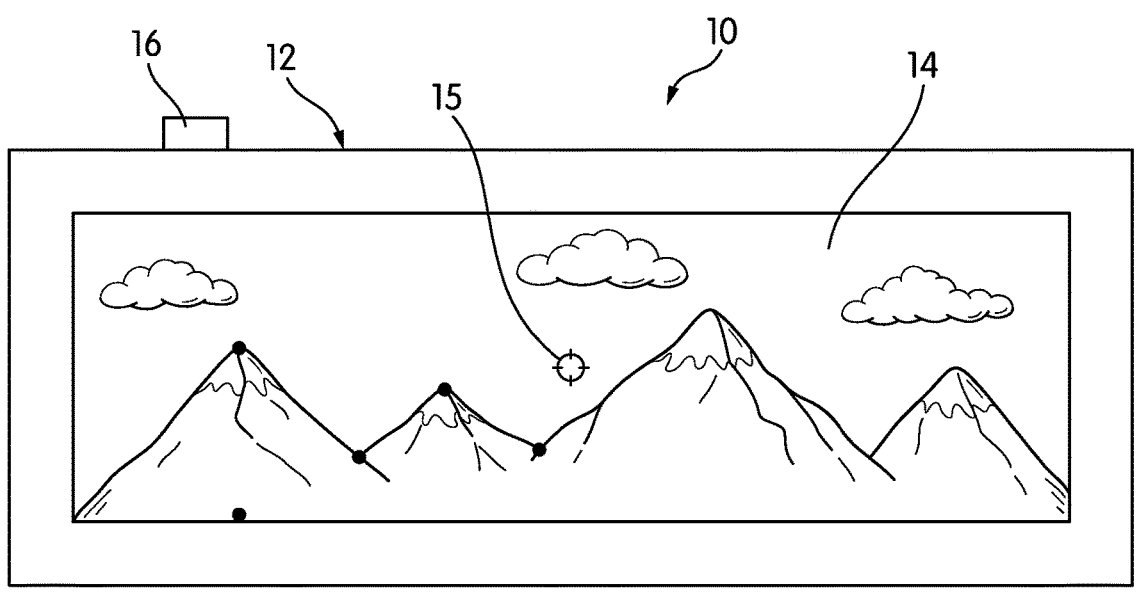
FIG. 2 is a rear elevational view of the measuring device of FIG. 1.

FIG. 1 is a front elevational view of a measuring device, generally indicated at 10, according to one embodiment of the invention, and FIG. 2 is a rear elevational view. The measuring device 10 uses optical triangulation to determine at least a scalar distance to an object, although in many cases, the measuring device 10 may also be used to establish a vector to the object in question, a vector or vectors between multiple objects, or to determine differences in elevation between objects. Additionally, although the term "measuring device" is used here for convenience, as will be described below in more detail, embodiments of such devices may also be used to track objects and to provide other information that can be derived from stereo images and methods of optical triangulation. Preferably, measurements are made and information provided in real time, i.e., as soon after the request is made as possible, usually within at least 5 seconds, and often within less than one second.

The measuring device 10 has the shape and form-factor of a traditional digital camera, with a rectilinear body 12 and a large touch-screen display 14 that consumes most of the space on the reverse. The operating controls may be based in software and implemented through the touch screen 14, or there may be one or more physical buttons 16 on the body 12 to activate the measuring device 10 and to perform other functions.

As will be described below, the measuring device 10 has an optical system that has two fixed-position optical imaging elements that are aligned with one another but are spaced from one another. Here, the terms "fixed position" and "fixed element" mean that the primary imaging elements in the measuring device 10 are fixed in position. Unlike a traditional optical rangefinder, the elements that generate a stereo image do not rotate or otherwise move to cause image convergence. However, in the fixed-element measuring device 10, there may be secondary components, such as lenses, that do move to focus the image or to change the focal length of the system. The terms "element" and "optical element" refer to traditional optical elements such as mirrors, prisms, and beam-splitters, as well as to digital sensor elements when a stereo image is produced by using two digital sensors, instead of traditional optical elements, as will be described below in more detail.

In the front elevational view of FIG. 1, there are two windows 18, 20 that allow incoming light and other radiation to reach the optical imaging elements within the body 12. These windows 18, 20 are aligned with one another vertically and horizontally on the body 12 and are spaced as far from each other as practical along the body 12, because greater spacing tends to increase the resolution of the measuring device 12, although they may be spaced more closely together in other embodiments.

Figure 3:
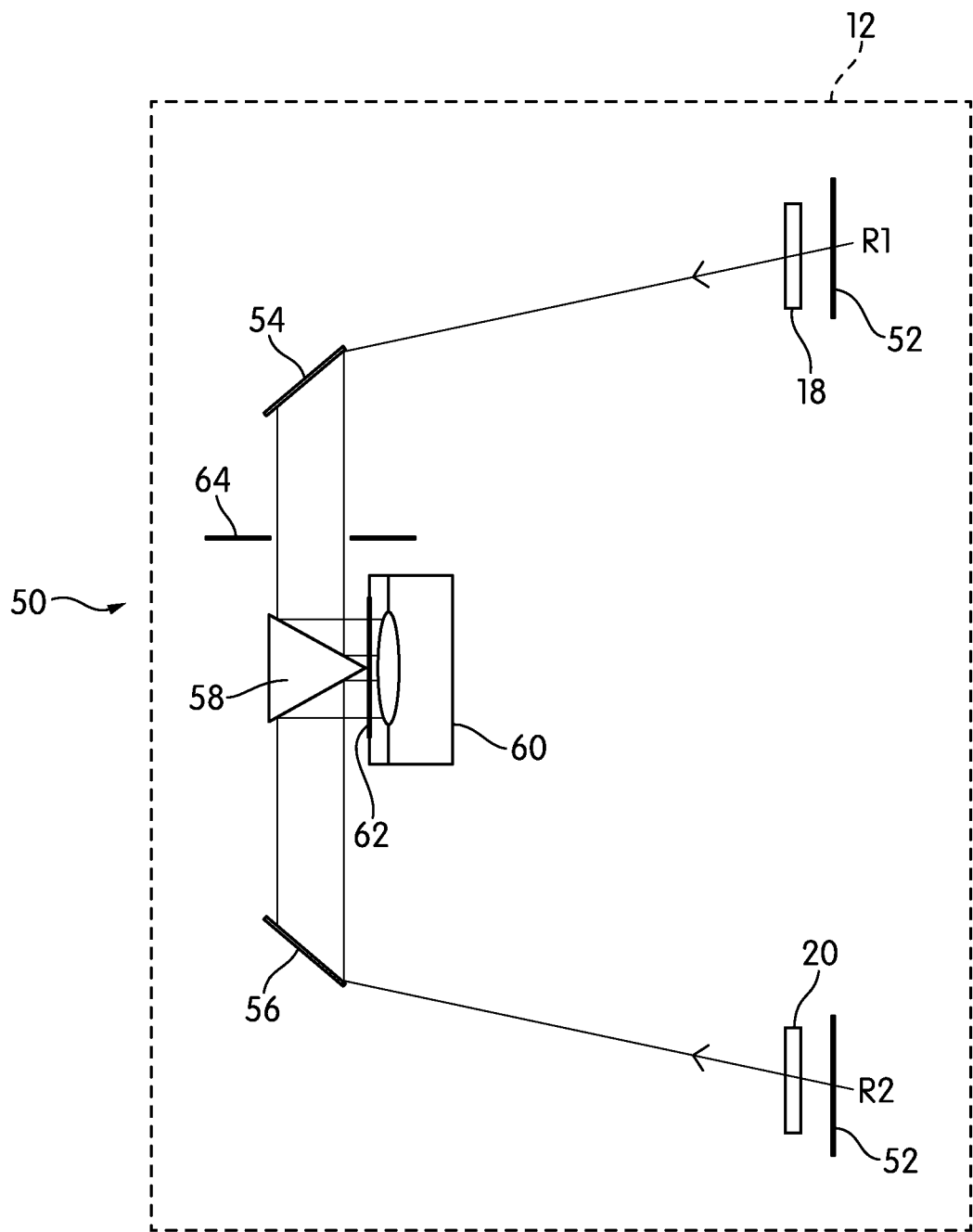
FIG. 3 is a schematic illustration of one embodiment of a stereo optical system for the measuring device of FIGS. 1 and 2.

FIG. 3 is a schematic illustration of an optical system, generally indicated at 50, that may be used in the measuring device 10. The optical windows 18, 20 are shown in the view of FIG. 3. While not shown in FIG. 1, the optical windows 18, 20 may be provided with shutters or caps 52, both to keep the windows 18, 20 clean and to prevent light from entering through one or both of them.

The optical system 50 is a stereo optical system that produces stereo images. As the term is used here, a "stereo image" refers to a composite image of an object produced by two separate, aligned but spaced-apart optical elements, each of which produces a separate image of the object. The two separate images of the object in the composite stereo image are referred to as "stereo copies" in this description. The distance between the stereo copies of the object in the stereo image is related to the physical distance between the optical system 50 and the object. It is this relationship that the measuring device 10 uses to establish distance to the object.

Optical systems according to embodiments of the invention may use various combinations of prisms, mirrors, beam splitters, lenses, and other traditional optical elements. In the optical system 50 of FIG. 4, light rays R1, R2 enter the optical windows 18, 20 and strike a pair of angled mirrors 54, 56 that are aligned with one another but spaced from one another. The mirrors 54, 56 reflect the light rays R1, R2 into a prism 58, which directs the light from both mirrors 54, 58 into a digital sensor 60, such as an active-pixel sensor. The prism 58 is centered between the two angled mirrors 54, 56, and all of the optical elements 54, 56, 58 are fixed in place. Interposed between the prism 58 and the sensor 60, or incorporated into the sensor 60 in some embodiments, is a filter 62 that filters the incoming light before it reaches the digital sensor 60.

In addition to external shutters or caps 52, the optical system 50 may have an internal shutter 64 to selectively and temporarily block one of the optical pathways in order to produce a standard, non-stereo image using only one set of optical elements. This may be used temporarily in order to provide a viewfinding image for the touch screen 14, or it may be used in a user-selected digital camera mode, if the user wishes to capture digital images. In the illustration of FIG. 3, the shutter 64 is in the optical pathway of the light ray R1, interposed between the mirror 54 and the prism 58. However, the shutter 64 may be located anywhere in either optical pathway.

The illustration of FIG. 3 is schematic so as to illustrate the concept of forming a stereo image. There may be other optical elements in the optical system 50 and in other optical systems according to embodiments of the invention. For example, additional mirrors, lenses, or prisms may be added to redirect light so that the main mirrors 54, 56 do not need to lie directly in line with the windows 18, 20. These kinds of additions may be used to make the optical system 50 more compact.

Much of this description assumes that the measuring device 10 operates using the visible light spectrum, i.e., light with wavelengths from about 380-740 nm. However, the measuring device 10 may operate using essentially any wavelengths of electromagnetic radiation on the spectrum. For example, the measuring device 10 may operate using near-infrared, infrared, near-UV, or UV wavelengths, to name a few. In some cases, shorter, higher-energy wavelengths, like X-rays, may also be used. The precise range of wavelengths that is sensed for any particular application will depend on the spectrum of electromagnetic energy that is emitted by or reflected from the object in question. Additionally, some embodiments may use two or more different ranges of wavelengths, or may selectively amplify a particular range of wavelengths. For example, the intensity of some wavelengths of light may be enhanced, as in night-vision systems.

Adapting the measuring device 10 for ranges of the electromagnetic spectrum outside of the visible light spectrum may involve selecting a digital sensor 60 that is sensitive in the desired range. In some cases, however, the digital sensor 60 may be sensitive to a broad range of the electromagnetic spectrum, in which case, a filter 62 or filters may narrow the spectrum of energies received by the digital sensor 60 to the desired range. Other types of internal filters may be used, like anti-aliasing filters, if desired.

Figure 4:
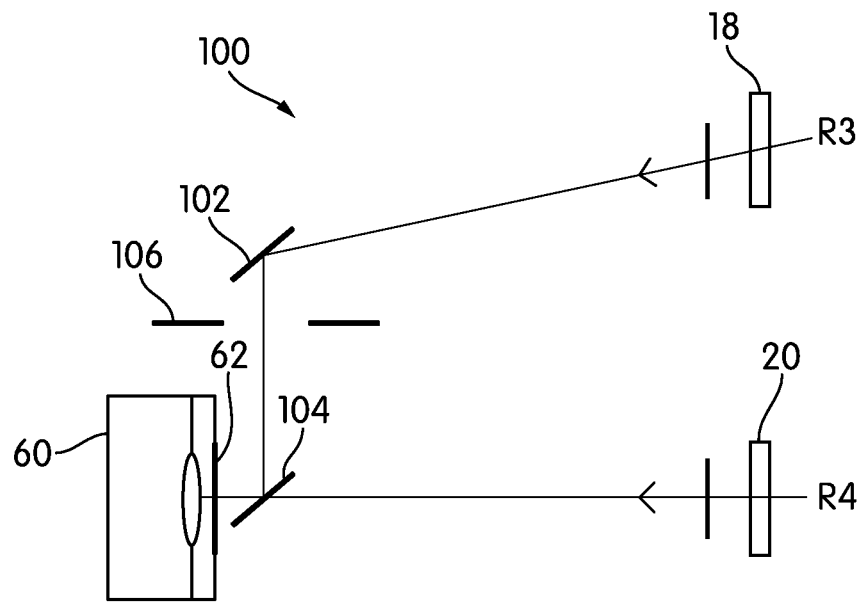
FIG. 4 is a schematic illustration of another embodiment of a stereo optical system for the measuring device of FIGS. 1 and 2.

FIG. 4 is a schematic illustration of a stereo optical system, generally indicated at 100, that is a variation on the concept of FIG. 3. In the system 100 of FIG. 4, an angled mirror 102 and a beam splitter 104 are used as optical elements, aligned but spaced from one another. Light ray R3 moves through the optical window 18 and is reflected by the mirror 102 toward the beam splitter 104, which directs it into the digital sensor 60. Light ray R4 enters the optical window 20 and transits the beam splitter 104 to enter the digital sensor 60. Notably, the digital sensor 60 faces the optical windows 18, 20 in this embodiment. As with the optical system 50 described above, the elements 102, 104, 60 of the optical system 100 are fixed in place. As shown, a filter 62 may be interposed between the beam splitter 104 and the digital sensor 60. An internal shutter 106 lies in the optical pathway of the light ray R3, between the mirror 102 and the beam splitter 104, so that one optical pathway can be shut down, as described above, for viewfinding or digital image capture of a mono-image.

Figure 5:
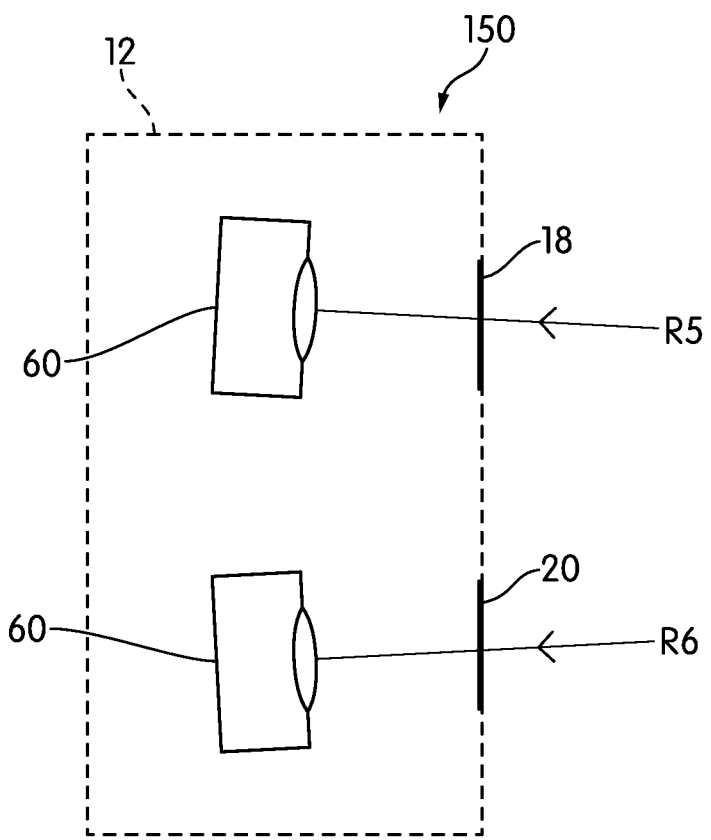
FIG. 5 is a schematic illustration of yet another embodiment of a stereo optical system for the measuring device of FIGS. 1 and 2.

FIG. 5 is a schematic illustration of another embodiment of a stereo optical system, generally indicated at 150, that produces stereo images. In the optical system 150, two digital sensors 60 are provided, spaced from one another and facing the optical windows 18, 20. The two spaced-apart digital sensors 60 receive separate sets of light rays R5, R6 and form separate images. The two digital sensors 60 may be tilted toward each other, e.g., 2-3°, in order to form a true stereo image. The difference between the stereo optical system 150 and the stereo optical systems 50, 100 described above is that in the systems 50, 100, the two images are optically combined at the digital sensor 60, whereas in the system 150 of FIG. 5, the two images produced by the two optical sensors 60 are digitally combined into the same frame by a dedicated processing circuit or the main control unit of the measuring device 12, as will be described below in more detail. That may require more computational time to achieve; however, one advantage of the stereo optical system 150 of FIG. 5 is that it may consume less space. In the stereo optical system 150, an internal shutter is unnecessary; if viewfinding or digital image capture is necessary, the controller can either shut down or ignore one of the two digital sensors.

Another advantage of a system like the stereo optical system 150 is that the information from each digital sensor 60 can be used independently, if desired. For example, in some embodiments, the information from one digital sensor 60 can be used to form a mono-image for viewfinding or other purposes while in parallel, the information from both digital sensors 60 is combined to form a stereo image. As will be described below in more detail, the output from one digital sensor 60 need not be sent only to an onboard touch screen display 14. Additionally or alternatively, the data from one digital sensor 60 could be sent to an external display.

Those of skill in the art will note that some conventional digital cameras, such as those used on modern cell phones, have multiple camera elements that are used simultaneously to produce various effects in the resulting image, which is typically constructed with software or dedicated hardware after capture. One difference between those systems and embodiments of the present invention is that in conventional cell phone camera systems, the cameras are spaced together as closely as possible, so that each camera element is taking an exposure from virtually the same vantage point. By contrast, the two digital sensors 60 of the optical system 150 are separated as widely as possible from one another in order to create a stereo image.

In the embodiments described above, light reaches the optical systems 50, 100, 150 through windows 18, 20 that do not significantly modify the incoming light. This may be particularly suitable for situations in which magnification is not required. However, there are numerous situations in which more control of the incoming light is desirable. In those cases, lenses may be used instead of simple windows.

Figure 6:
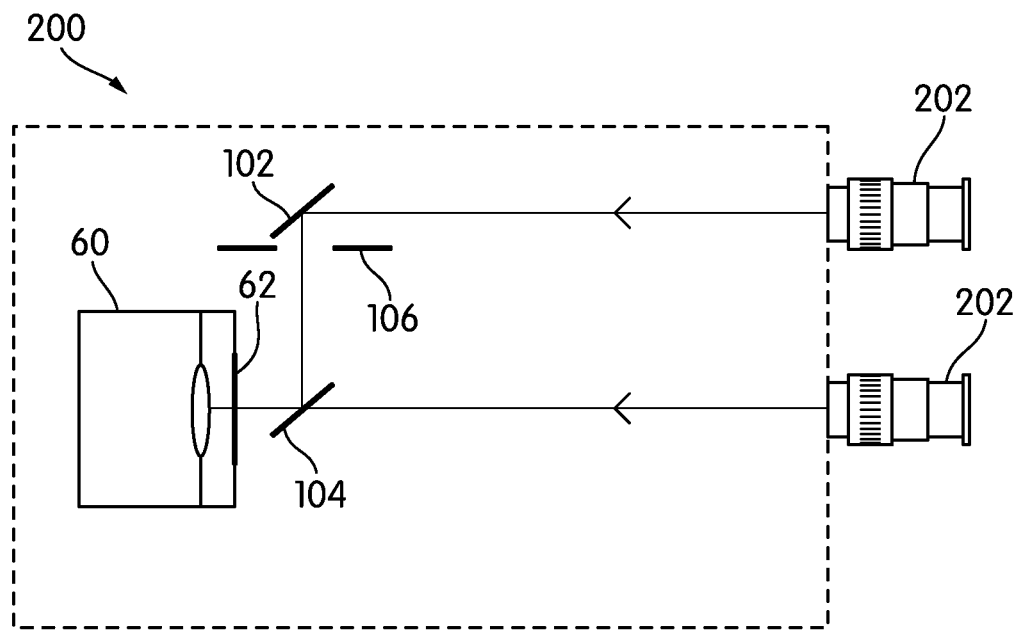
FIG. 6 is a schematic illustration of an embodiment of a stereo optical system with zoom lenses in front of the stereo optical system for the measuring device of FIGS. 1 and 2.

FIG. 6 is a schematic illustration of a stereo optical system, generally indicated at 200, according to yet another embodiment of the invention. In the optical system 200, a lens 202 is added over each optical path. The optical system 200 is otherwise identical to the optical system 100 of FIG. 4. However, it should be understood that lenses 202 can be used with any optical system.

The lenses 202 in the two optical paths are usually identical to one another, in order to preserve the identity of the stereo copies in the stereo image, although there may be limited circumstances in which slightly different lenses are used. The two lenses 202 would typically be oriented inward, toward each other, by a few degrees (e.g., 1-5°, typically 2-3°) in order to form a stereo image. There may also be limited circumstances in which the lenses 202 are not aimed at the same plane, e.g., where one lens 202 is aimed 2-3° above or below the other. The lenses 202 may be permanently-installed, motor-driven lenses that are fixed to the body 12 of the measuring device 10. Alternatively, in some embodiments, the lenses 202 may be interchangeable, which would allow the measuring device 10 to be adapted for different applications. In the case of interchangeable lenses 202, the body 12 may include, e.g., a bayonet mount. The lenses 202 would typically be controlled to zoom to the same focal length. The advantage of lenses 202, and particularly zoom lenses, is that they potentially provide a much greater distance between the point of interest and its stereo copy, which leads to better resolution and, potentially, more accurate distance measurement across a wide range of distances.

Figure 7:
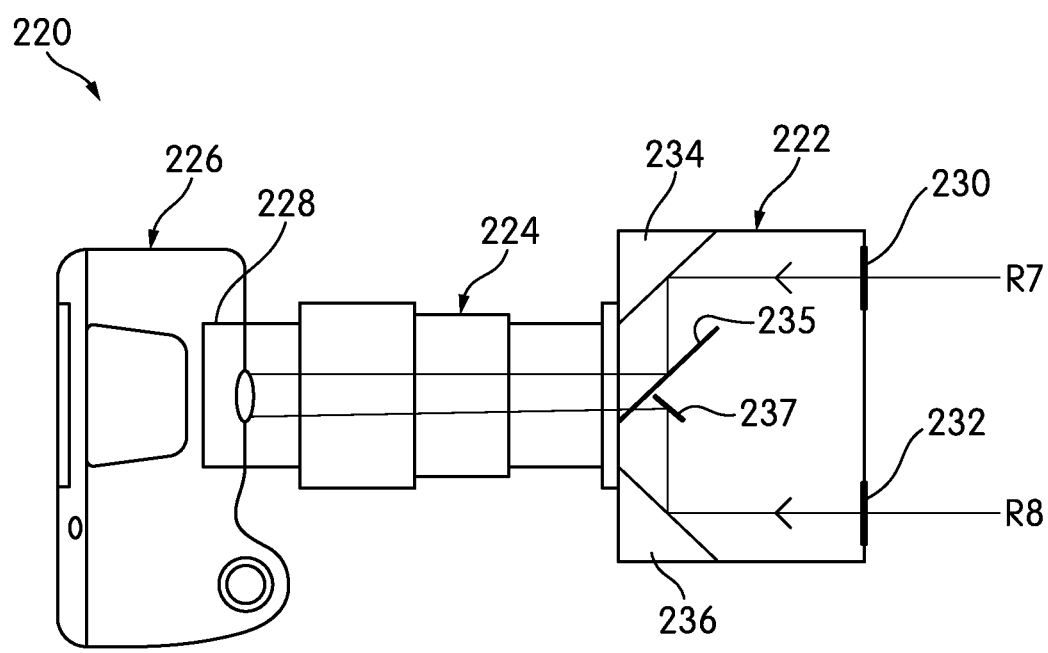
FIG. 7 is a schematic illustration of a measuring device with a zoom lens behind the stereo optical system.

In the illustration of FIG. 6, there are two lenses 202, each placed in front of the stereo optical components. However, in other embodiments, the lens and the digital sensor may be placed behind the stereo optical components. This is shown in FIG. 7, a schematic illustration of a measuring device, generally indicated at 220. The measuring device 220 of FIG. 7 includes three modular, separable components: a front-end stereo optical system 222, a zoom lens 224, and a main body 226, which includes a digital sensor 228, as well as the electronic components necessary to perform the rangefinding operations, which will be described below in more detail.

The front-end stereo optical system 222 may be any stereo optical system. In FIG. 7, the stereo optical system 222 is different than the stereo optical systems described above. Specifically, light enters through a pair of windows 230, 232 at the front of the stereo optical system 222. The windows 230, 232 typically would not modify the light significantly, although in some embodiments, they may act as filters, such as neutral-density filters. Light rays R7 and R8 are directed by two fixed prisms 234, 236 toward the center of the enclosure. Light ray R7 is reflected by a beam splitter 235 into the zoom lens 224. Light ray R8 from the other prism 236 is reflected by a mirror 237 and passes through the beam splitter 225 into the zoom lens 224. It should be understood that the beam splitter 235 may be a beam splitter that passes 50% of incident light and reflects the other 50%. As a general matter, it is not critical that 100% of the light entering the stereo optical system 222 reach the digital sensors 60, so long as sufficient light reaches the sensors 60 to form an image.

The zoom lens 224 may be of any type, and have any number of internal lenses or optical elements. Once again, this arrangement is illustrated only for the sake of example; modern zoom lenses may have any internal construction.

Preferably, the zoom lens 224 includes a digital interface and is capable of reporting its basic characteristics and focal length to the other components of the measuring device 220, for reasons that will be explained below. Depending on the embodiment, the zoom lens 224 may be manually or automatically focused, and may include motors or other such elements for that purpose. Alternatively, any motor or other such driving element could be located within the body 226 of the measuring device 220, with power transmission into the zoom lens 224.

With the measuring device 220 of FIG. 7, the components 222, 224, 226 may be mounted together using, e.g., standard screw mounts or bayonet mounts. With this arrangement, any of these components 222, 224, 226 may be changed as needed to suit particular applications or to upgrade components as new ones become available.

FIG. 7 also illustrates another principle. While much of this description implies that the measurement device 10 is a purpose-built device, and it will often be, a measurement device according to an embodiment of the invention could also take the form of a modular attachment to an existing imaging device. For example, the main body 226 could be a digital camera, and that digital camera could be upgraded in its software to handle at least some of the functions described here. A front-end stereo optical system 222 could also be clamped over, or otherwise attached over, the higher-resolution camera (typically, the rear camera) of a smart phone, and the smart phone could be programmed to perform the functions of the measurement device 10.

Figure 8:
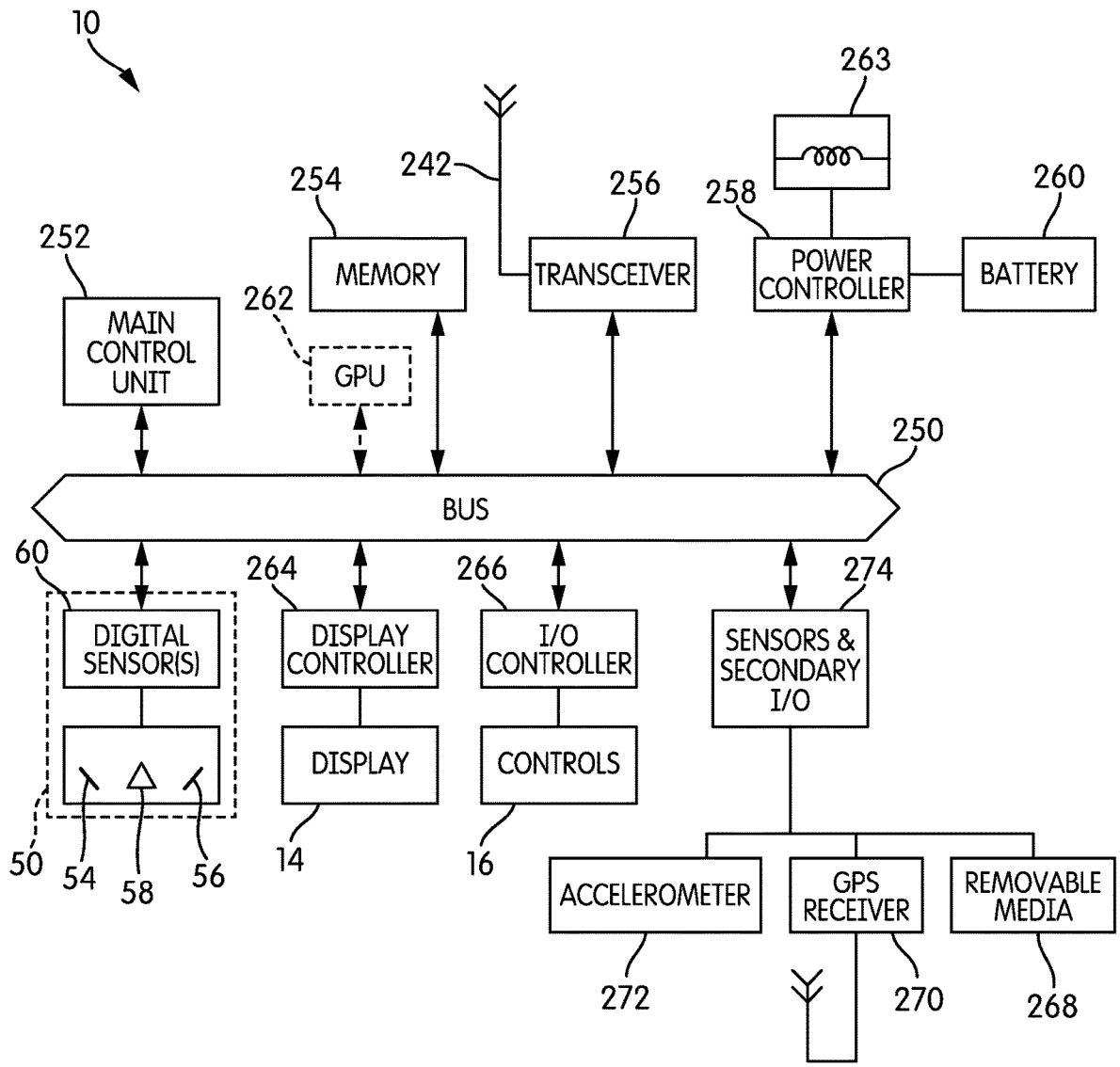
FIG. 8 is a schematic illustration of the components of the measuring device of FIG. 1.

FIG. 8 is a schematic illustration of the electronic components and interfaces of the measuring device 10. (For these purposes, the measuring device 220 described above should be considered to have the same or similar components.) A data bus 250 or other such circuitry facilitates internal communication between the components of the measuring device 10. Connected to the bus 50 and in communication through the bus 50 are components typical of a computing device, including a main control unit 252, memory 254, a transceiver 256, and a power controller 258 that controls the charging and discharging of a battery 260. While these components are shown separately in FIG. 7 for ease in description, the main control unit 252, memory 254, transceiver 256, power controller 258, and other components illustrated in FIG. 7 may be integrated together as a system-on-a-chip or in some other integrated fashion.

The main control unit 252 may be a microprocessor, an application-specific integrated circuit (ASIC), a field-programmable gate array (FPGA) or any other type of computing circuit capable of performing the functions ascribed to it in this description. In some embodiments, a graphics processing unit (GPU) 262 may be included, although for cost reasons, it may be advantageous to omit a GPU if possible. If a GPU is included, it may be a separate integrated circuit, or it may form a part of the main control unit 252. A microprocessor-based main control unit 252 may have any number of processing cores.

The memory 254 within the measuring device 10 may be of several types, including read-only memory or other such memory that contains basic system instructions and controls basic functions; cache memory; random-access memory; and data storage memory, such as flash memory or a solid-state drive.

The transceiver 256 allows the measuring device 10 to communicate over one or several frequency bands using one or more communication protocols. The transceiver 56 may be or include a WiFi chipset, a BLUETOOTH™ chipset, or a cellular communication modem, for example. The transceiver 256 is connected to the antenna 242.

The power controller 258 and battery 260 are also associated with an inductive charging system 263. The inductive charging system 263 is optional, but allows the battery 260 to be charged without requiring the measuring device 10 to be plugged in using a physical cable. This may allow some embodiments of the measuring device 10 to be sealed against water and the elements. While ingress protection may not be a critical feature in all embodiments, ingress protection and the ability to handle mechanical and temperature shocks, as well as other environmental and performance extremes, may be helpful in all embodiments.

The digital sensors 60 also communicate with the main control unit 252 through the bus 250. A display controller 264 in communication with the bus drives the display. If the display is a touch screen display 14, the display controller 264 or another element may provide control over the touch screen capabilities as well. An input/output (I/O) controller 266 provides an interface between whatever physical buttons 16 or controls are present on the measuring device 10 and the bus 250. If primary I/O is via a touch screen display 14, the I/O controller 266 may interface with that as well.

The measuring device 10 may benefit from having certain additional sensors and devices, and controllers may be provided for those sensors and devices as well. For example, in some cases, the measuring device 10 may include a port or slot 268 for removable media, such as SD or compact flash cards. Such media may be useful in capturing digital images or saving other data created by the measuring device 10. In embodiments in which it is helpful for the measuring device 10 to be sealed against the elements, data transfer may be accomplished wirelessly, or using inductive-transfer data ports.

The measuring device 10 may also include sensors allowing it to establish its position in three-dimensional space, which may be useful in establishing the relative or absolute positions of objects. Such sensors may include a GPS receiver 270, as well as accelerometers, inclinometers, or gyroscopes 272, which can be used to judge the inclination of the measuring device 10, or to provide positioning data for distance adjustment if the device 10 is moving while collecting data. In the illustration of FIG. 7, these components share an interface 274, although they may have separate controllers or interfaces in other embodiments, or they may communicate directly with the bus 250.

Figure 9:
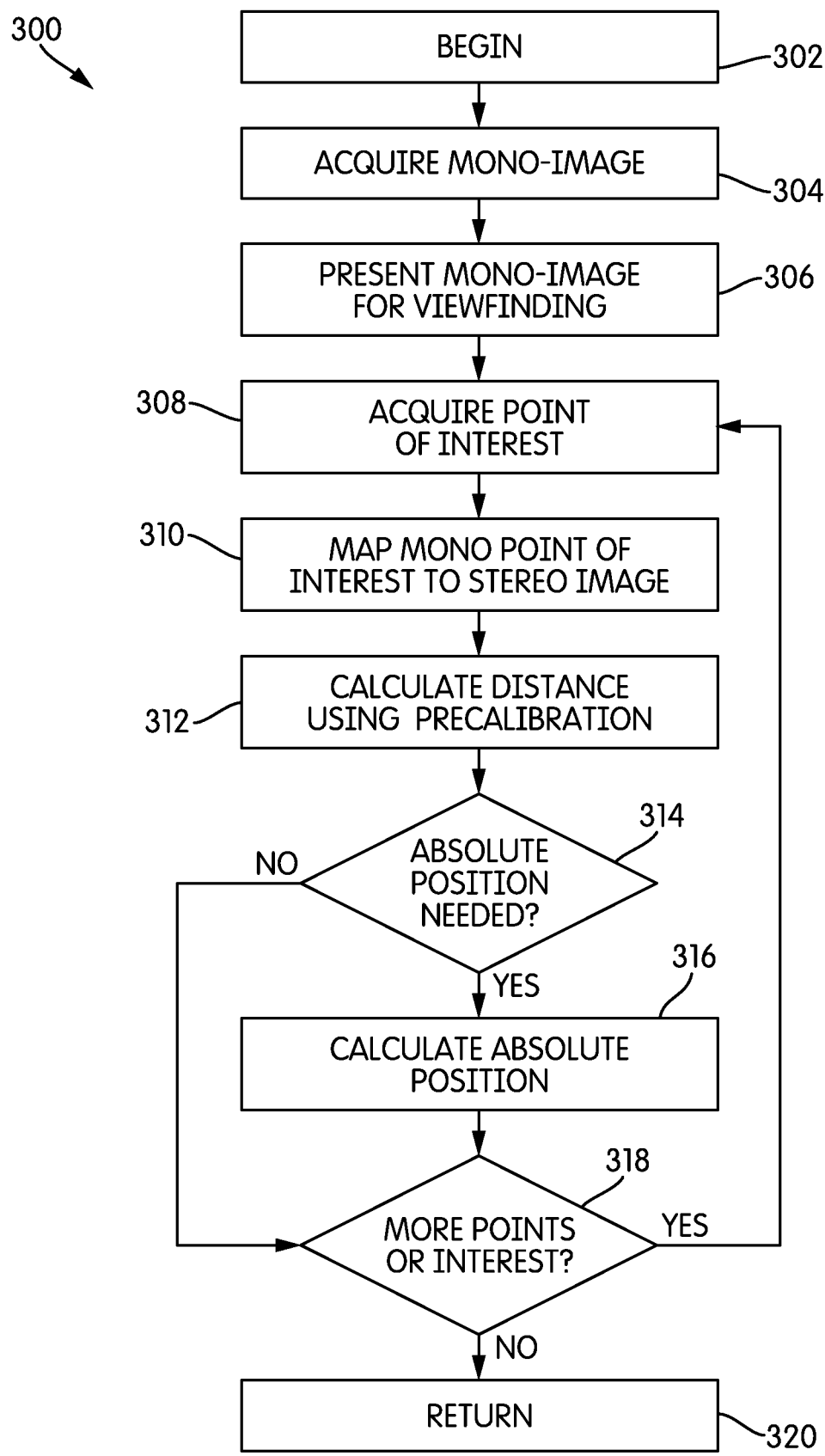
FIG. 9 is a flow diagram of a method for determining distances and positions using a stereo optical measuring device.

FIG. 9 is a flow diagram of a method, generally indicated at 300, for determining distance and position. Method 300 uses the measuring devices 10, 250 described above. Method 300 begins at 302 and continues with task 304. In task 304, a mono-image is acquired for purposes of manual viewfinding. As described above, a stereo image is a composite image produced by two optical elements. A mono-image, for purposes of this description, is an image produced by only one of the two optical elements. Mono-images may be used for viewfinding purposes, for documentary purposes, or for other purposes.

Acquiring a mono-image using a stereo optical system typically involves shutting down one of the two pathways. The manner in which a mono-image is acquired will vary with the nature of the stereo optical system 50, 100, 150, 200, and typically involves temporarily shutting down or ignoring the input from one of the two optical pathways.

This may be done, for example, by closing a shutter 62 in a stereo optical system 50 that includes a shutter 62 for this purpose or, in the case of two digital sensors 60, discarding the input from one digital sensor 60 or temporarily shutting the digital sensor 60 off. These actions can be accomplished automatically. In some cases, if no automatic mechanism is present for closing a shutter or ignoring input, the user may simply be prompted to close a lens cap 52 over one of the two windows 18, 20, or to take some other, similar action.

Preferably, the action taken in task 304 is always the same action. That is to say, if the right-side optical path of the stereo optical system 50 is closed to form a mono image, the right-side optical path is always the path to be closed.

As those of skill in the art will realize, some measurement devices according to embodiments of the invention may include an additional digital sensor and appropriate optics for the purpose of taking conventional digital mono-images, to be used for rangefinding and other purposes. If so, task 304 would typically involve using this system. Method 300 continues with task 306. In addition to single image capture, an additional digital sensor could be used to capture video or to stream a "viewfinder" view of a scene to an external monitor using the transceiver 256. The measurement device 10 may implement a remote display protocol for that purpose.

In task 306, the acquired mono-image is presented for viewfinding purposes. This involves displaying the image on the screen 14. In some cases, the image displayed on the screen 14 may be left-shifted or right-shifted (depending on which optical pathway is used to form the mono-image) in order to simulate the appearance of a mono-image taken from on-center. This shift may be executed even if it means cropping the resulting image.

If the measurement device has a separate camera for taking mono-images, task 306 of method 300 may involve presenting that image. Typically, a dedicated mono-image camera would have a position and optics that allow it to simulate the field of view of the stereo image. In any case, the mono-image may also be shifted or otherwise transformed as necessary. Method 300 continues with task 308.

In task 308, the measuring device 10 acquires the point of interest. Here, the term "point of interest" refers to the point whose range is to be determined. The method by which the point of interest is acquired depends on the embodiment. In the measuring device 10, a graphical user interface is provided that allows the user to select the point of interest graphically, by touching the touch screen 14. The user may select the point of interest by placing a reticle 15 over the point of interest, or by moving the image on the touch screen 14 until the point of interest is under the reticle 15. As will be described below in more detail, in some embodiments, the user may select multiple points of interest in succession, each one of which is queued for processing.

Method 300 continues with task 310. At the completion of task 308, one or more points of interest on a mono-image have been selected. As method 300 continues, the measuring device 10 maps a point of interest from the mono-image to a location on a corresponding stereo image. Stored in the memory 254 of the measuring device is a look-up table or other such data storage structure in which a correspondence is stored between pixel locations on a mono-image and pixel locations on the corresponding stereo image. That data is used to map the mono-image point of interest to a pixel location on the corresponding stereo image. Instead of a look-up table, a precalibrated function that converts a location on the mono-image to a location on the stereo image may be used.

As for the stereo image itself, during task 310, the measuring device 10 may acquire a corresponding stereo image to which to map the point of interest, or that stereo image may be acquired shortly before or shortly after the mono-image is acquired, earlier in method 300. In some cases, the measuring device 10 may acquire stereo images continuously, or nearly continuously, during all periods of time when a shutter 64 is not closed or an optical pathway is not otherwise disabled. In other cases, the measuring device 10 may alternate quickly between acquiring mono-images and stereo images, so that there is always a mono-image for rangefinding and a corresponding stereo image for the rest of the operations. It should be realized that the acquisition of a mono-image and the identification of points of interest on the mono-image are matters of convenience for the user, because it may be easier for a user to manually select points on a conventional image. Thus, these are optional tasks; in some embodiments, points of interest may be selected directly on the stereo image.

In task 312, the measuring device 10 calculates a distance to the point of interest. Task 312 has two basic sub-tasks. First, the measuring device 10 locates the stereo copy of the point of interest in the stereo image and determines the image distance between the point of interest and its stereo copy. Second, the measuring device 10 relates the image distance between stereo copies in the stereo image to a physical distance between the measuring device 10 and the object.

From task 310, the measuring device 10 knows the pixel location of the point of interest in the stereo image. The measuring device 10 uses basic knowledge about the optical system 50, 100, 150, 200 to simplify the process of searching for the stereo copy of the point of interest.

Figure 10:
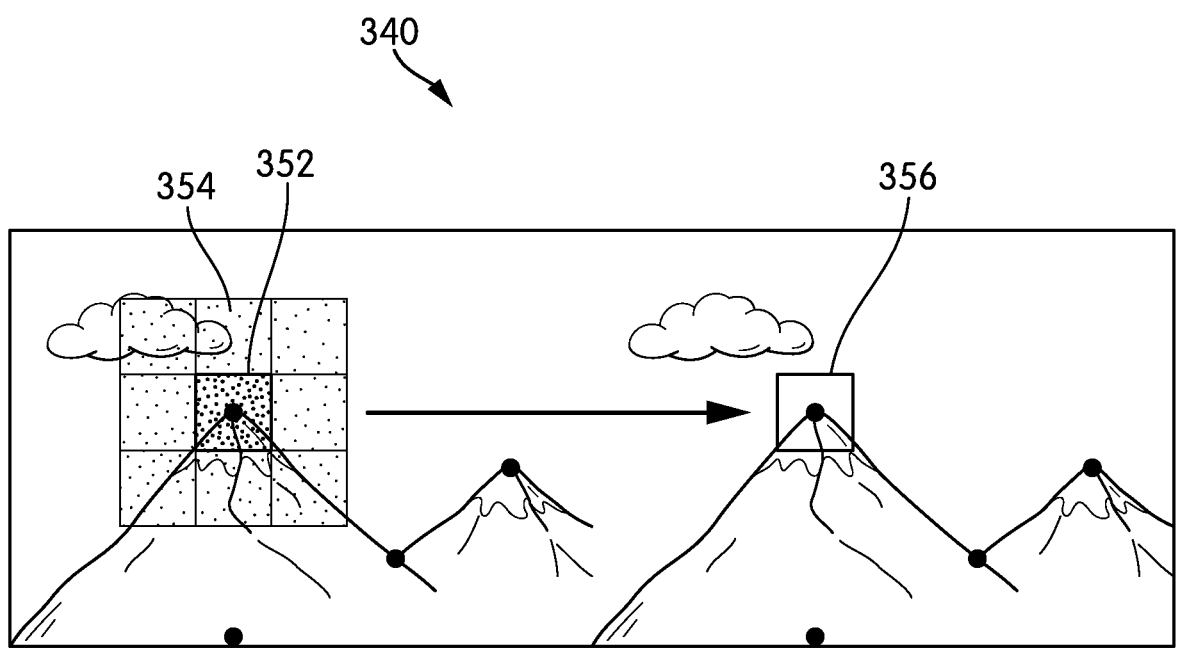
FIG. 10 is an illustration of a stereo image, showing the process of searching the image for a second stereo copy of a point of interest, as in the method of FIG. 9.

FIG. 10 is an illustration of a stereo image 340, demonstrating the process for finding the stereo copy of the point of interest. In FIG. 10, the image 340 is shown with pixels that are exaggerated in size, for the sake of clarity. The point of interest 352 is, in this case, a single pixel, shaded in the view of FIG. 10 for identification purposes.

The measuring device 10 begins by defining a search template. Each pixel in a digital image is usually defined by a set of color values, typically a triplet defining values for red, green, and blue. When one is searching for a single pixel, it is possible that the color values (or other defining values) of the point of interest 352 will match the color values (or other defining values) of other pixels that are not the point of interest or its stereo copy. A "search template," as the term is used here, is a larger image area around the point of interest that is highly unlikely to match anything other than the stereo copy of the point of interest.

The search template may be determined by the algorithm that detects touch on the touch screen 14. In that case, the search template may correspond to the pixels over which touch was sensed, and the point of interest may be the calculated centroid of that region, in line with typical touch-sense algorithms.

Whether or not a touch screen 14 is used, the search template may also be defined in a number of other ways. If the point of interest 352 is a specific pixel, the measuring device 10 may define the search template as the pixel that defines the point of interest 352 plus a certain number of surrounding pixels. In FIG. 10, the search template 354 includes the point of interest 352 as the center pixel, plus all surrounding pixels. Thus, in this illustration, the search template 354 includes nine pixels and is square in shape. Ultimately, any number of pixels may be included in the search template 354, and the search template 354 may be of any shape, so long as the number of pixels in the template 354 and their variety of color values make it highly improbable that the search template 354 will match any set of pixels in the image except for the stereo copy of the point of interest.

In FIG. 10, the stereo copy of the point of interest is indicated at 356. If desired, the measuring device 10 could implement a general image search algorithm to find an image region that matches the search template 354. However, as was noted briefly above, certain information about the optical system 50, 100, 150, 200 can be used to simplify the search. More particularly, the measuring device 10 always uses the same optical path to create the mono-image. If, for example, the left optical pathway is always used to create the mono-image, and the point of interest identified on that mono-image is always mapped onto the left side of the stereo image, the measuring device 10 can implement a search for the stereo copy 356 of the point of interest 352 simply by beginning at the point of interest 352 and searching in a straight line to the right, advancing one column at a time, as illustrated in FIG. 10, until a match for the search template 354 is found. In other words, the measuring device 10 selects an image set of pixels that matches the size and shape of the search template and compares that image set of pixels with the search template 354. If the image set of pixels is not a match with the search template 354, the measuring device 10 selects a new image set of pixels by shifting one column to the right and making another comparison until the image set of pixels matches the search template 354. As shown, the stereo copy 356 of the point of interest 352 is aligned with the point of interest 352 but is located directly to the right of it. In the example of FIG. 10, the stereo copy 356 of the point of interest 352 will be located within a few comparisons.

In some embodiments, Gaussian correlation may be used to identify corresponding pixels in two stereo-copies within a stereo image. In this kind of statistical correlation process, a probability distribution—in this case, a Gaussian distribution—is constructed using the pixel intensities or other characteristics of the pixels representing the search template. The Gaussian distribution from the search template is correlated with the Gaussian distribution from the pixels being examined as a form of interpolation, in order to improve the accuracy of corresponding-pixel identification and the resulting distance measurements.

One way to calculate the physical distance from the measuring device 10 to the point of interest 352 is by trigonometry. Trigonometric solutions to problems like this usually involve reducing the problem to a triangle that has at least one leg of a known length and at least one known interior angle, and then solving for the length of the unknown leg of the triangle. For example, in the present case, the point of interest 352 is located some linear distance away from the measuring device 10, and it is that distance that is to be calculated trigonometrically. The angle between the measuring device 10 and the point of interest 352 can be determined, e.g., by measuring how far the stereo copies of the point of interest 352 are from the center of the field of view, or from one of the boundaries of the stereo image, or alternatively, by using an onboard accelerometer, inclinometer, or gyroscope 272 to measure the angle at which the measuring device 10 is set. Another leg of the triangle could be defined either by using the known length between optical elements in the optical system 150, 200, or by using the distance between stereo copies of the point of interest 352, converted from pixel units to distance units.

Given the above, the physical distance to the point of interest 352 could be calculated trigonometrically, e.g., as in Equation (1) below:

$$D = S_1 \tan\theta \quad (1)$$

where D is the distance to the point of interest 352, $S_1$ is the separation distance of the optical elements or cameras in the optical system, and $\theta$ is the angle to the stereo copies of the point of interest 352.

Alternative trigonometric solutions are possible. For example, assume that the optical system 150 of FIG. 5 is used, meaning that there are two digital sensors 60, each trained on the point of interest. In that case, assume that there is some distance x between the centers of the two digital sensors 60, and that each digital sensor 60 forms an angle or bearing between the center of its field of view and the point of interest. If the angles or bearings are denoted as $\theta_1$ and $\theta_2$, the distance to the point of interest, D, can be calculated as in Equation (2) below:

$$D = \frac{x}{\tan(\theta_1) + \tan(\theta_2)} \quad (2)$$

While trigonometric solutions can be used in task 312 of method 300, and in other methods according to embodiments of the invention, there are some disadvantages in using these kinds of methods. For example, assuming that the object is up to 50 meters away from the measuring device 10, and the distance between mirrors 54, 56 in optical system 50 is on the order of 10 inches (25.4 cm), one ends up with a triangle that has a very long leg, a very short leg, and an interior angle $\theta$ that is likely very close to 90°. The value of the tangent function approaches infinity as $\theta$ approaches 90°. This means that the tangent function is very sensitive to variability and minor measurement error, because the tangents of, e.g., 88.8° and 88.9° are quite different.

For the above reasons, the use of empirical data that establishes a direct relationship between pixel distance and the physical distance to the point of interest 352 in task 312 may be more useful in many embodiments. For example, a series of images may be taken with an object at known distances from the measuring device. In each case, the distance between stereo copies of the object in the resulting image is determined. In simple cases, the resulting data may be saved as a lookup table within the measuring device 10, and the measuring device 10 may interpolate between data points using standard techniques.

While lookup tables and similar representations of empirical data may be used, there are more advantageous ways of using empirical data. In particular, empirical data can be used to create a continuous function that can then be used to calculate the distance to the point of interest using a measured pixel distance (in pixels, millimeters, or some other unit) quickly and simply. There are many statistical methods for fitting data to a function, and the methods used may vary from one embodiment to another. Regression analysis is perhaps the best-known technique for fitting data to a function, but other methods may be used as well. The type of function to which the data is fit is not critical, so long as the function adequately represents the underlying data as a continuous function across the span of possible distances to the measuring device 10.

Figure 11:
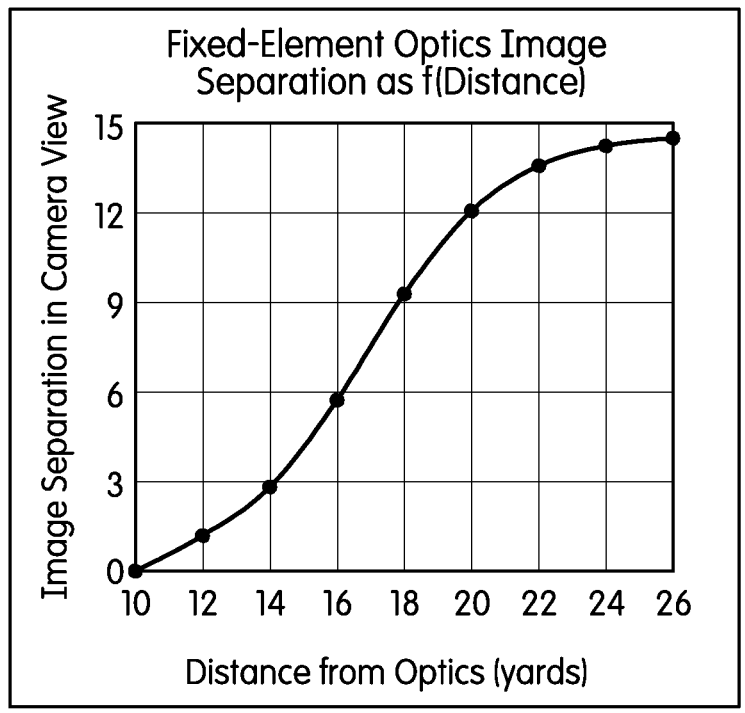
FIG. 11 is a graph of a function relating optical distance between stereo copies of a point of interest in a stereo image with physical distance to the measuring device.

FIG. 11 illustrates an example of a function that relates distance from the measuring device 10 to the separation distance, $D_1$, of stereo copies of a point of interest 352 in a stereo image. As shown, the function is a sigmoidal curve, empirically fitted from a number of measured data points. It has the form of Equation (3) below:

$$D_1 = \frac{e^\alpha e^\beta}{1 + e^\alpha e^\beta} \quad (3)$$

In Equation (3), β is defined as:

$$\beta = \frac{(D + \alpha)}{s} \quad (4)$$

where D is the distance between the measuring device 10 and the point of interest 352 and s is the sequential measurement sample number.

Figure 12:
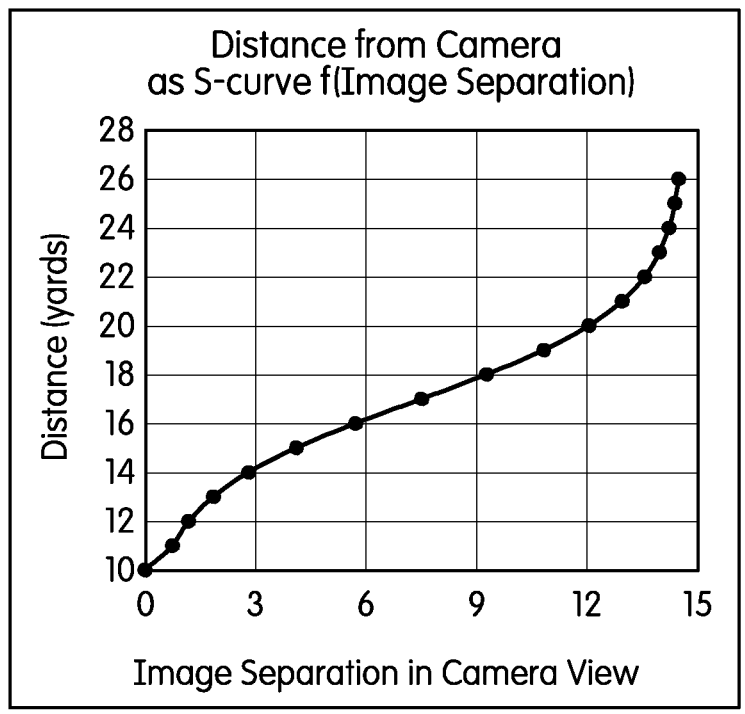
FIG. 12 is a graph of a function similar to that of FIG. 11 in which optical distance between stereo copies is the independent variable.

In many cases, a function that is created to represent the relationship between image distance and physical distance to the object of interest 352 may be transformed for easier calculation, such that the distance between stereo copies of the point of interest 352 is the independent variable and ordinate and the physical distance to the point of interest 352 is the dependent variable and abscissa. For example, FIG. 12 is a graph of a logit transform of the function of FIG. 11, such that image distance, $D_1$, is the independent variable and the physical distance D between the measuring device and the point of interest 352 is the dependent variable. This transform of Equation (2) is set forth as Equation (5) below:

$$D = -\ln\left(\frac{\left(\frac{1}{D_{1(s+2)}} - 1\right)}{\ln(e^\beta)} - 1.5\right) \quad (5)$$

It should be understood that although the empirical data points used to establish the functions in FIGS. 11 and 12 are shown along their respective curves in each figure, the functions themselves are continuous.

The above description contemplates a simple function that relates the spacing $D_1$ of stereo copies of the point of interest 352 with the horizontal linear distance D to the point of interest 352. More complex variations on this are possible. For example, if an optical system 150, 200 uses a zoom lens or lenses to limit the field of view or gain increased accuracy over certain distances, the relationship between $D_1$ and D would be different depending on the focal length of the lens. In that case, the measuring device 10 could use a function-of-functions, i.e., a function that defines a family of functions, each one of the family of functions describing the relationship between $D_1$ and D for a different focal length of lens. As a more specific example, assume that, based on empirical data, it is found that a three-term cubic polynomial of the following form accurately describes the relationship between $D_1$ and D:

$$D = bD_1 + cD_1^2 + dD_1^3 \quad (6)$$

The coefficients b, c, and d define the parameters of that function. The empirically-established function has one set of coefficients b, c, and d. The use of a lens of a particular focal length would most likely result in a function of the same form, but with different coefficients b, c, and d. A function could be defined to derive the coefficients b, c, and d for any given focal length. This function, which derives the coefficients for a family of functions, is the function-of-functions.

This concept of functions-of-functions may also be useful for other purposes. For example, an empirical function that that describes the relationship between $D_1$ and D would typically be constructed with data over a specific range of distances, e.g., 3 km. In that case, a function-of-functions could be defined to derive coefficients or other parameters for a function that covers the expected range of distances D to the point of interest 352. This would be used, for example, if the measuring device is equipped with a zoom lens; functions would be defined for a selection of the zoom lens's focal lengths, and a compound function (i.e., a function of functions) would be constructed to provide a continuous calibration over all possible focal lengths.

While the description above focuses on the use of empirical data to define a function, in some cases, an appropriate function to relate image separation to physical distance may be defined based on the underlying optical physics of the optical system 50, 100, 150, 200. Whatever the nature of the function, whether established empirically or derived from the optical physics of the system 50, 100, 150, 200, it is helpful if the function is continuous over at least the expected range of distances.

By the end of task 312, a physical distance to a point of interest 352 has been determined. This is a relative position, the position of the point of interest 352 relative to the position of the measuring device 10. Method 300 continues with task 314, a decision task. In task 314, the measuring device 10 determines whether or not it is necessary to determine an absolute position for the point of interest 352. If it is necessary to determine an absolute position (task 314: YES), method 300 continues with task 316, in which an absolute position is calculated. If it is not necessary to calculate an absolute position (task 314: NO), method 300 continues with task 318.

Before using the measuring device 10, the user may set certain settings that either require or do not require an absolute position. This could also be determined by, e.g., prompting the user with a dialog box on the touch screen 14 after a distance is determined.

If an absolute position is required, it is established in task 316. As was described above, the measuring device 10 may carry a GPS receiver 270 to establish its position. In that case, task 316 may involve using the latitude, longitude, and elevation of the measuring device 10 and adding the distance computed in task 312 to establish an absolute position. Method 300 continues with task 318, another decision task.

As was described above, multiple points of interest may be selected in task 308. If multiple points of interest are selected, they may be queued for successive rangefinding. There are other ways in which multiple points of interest may be ranged. For example, the user may be prompted to select another point of interest after a range is established to the first point of interest. Additionally, as will be described below in more detail, there are situations and methods in which the measuring device itself may choose additional points of interest using an algorithm. If additional points of interest are to be ranged, irrespective of how or when those points of interest are selected (task 318: YES), control of method 300 returns to task 308 and the next point of interest is acquired and ranged. If there are no additional points of interest to be ranged (task 318: NO), method 300 returns at task 320.

The measuring device 10 described above is a handheld model that may be useful, e.g., for basic ranging and surveying applications. However, embodiments of the invention may have many different forms and many different uses. For example, a measuring device according to an embodiment of the invention may be used to generate and analyze overhead imagery. In these cases, the measuring device would typically be mounted in a look-down pod or enclosure on an aircraft, or mounted on a satellite. The optical systems installed in such cases would vary with the application.

In some cases, measuring devices according to embodiments of the invention may be extended to other applications, and may have other form factors. One such application is automated or semi-automated creation and analysis of imagery for topographical mapping.

If used for topographical mapping applications, the measuring device would typically have the components of the measuring device 10 described above. In this embodiment, the measuring device would typically include a GPU 262 and may have more processing power than the measuring device 10 described above.

Figure 13:
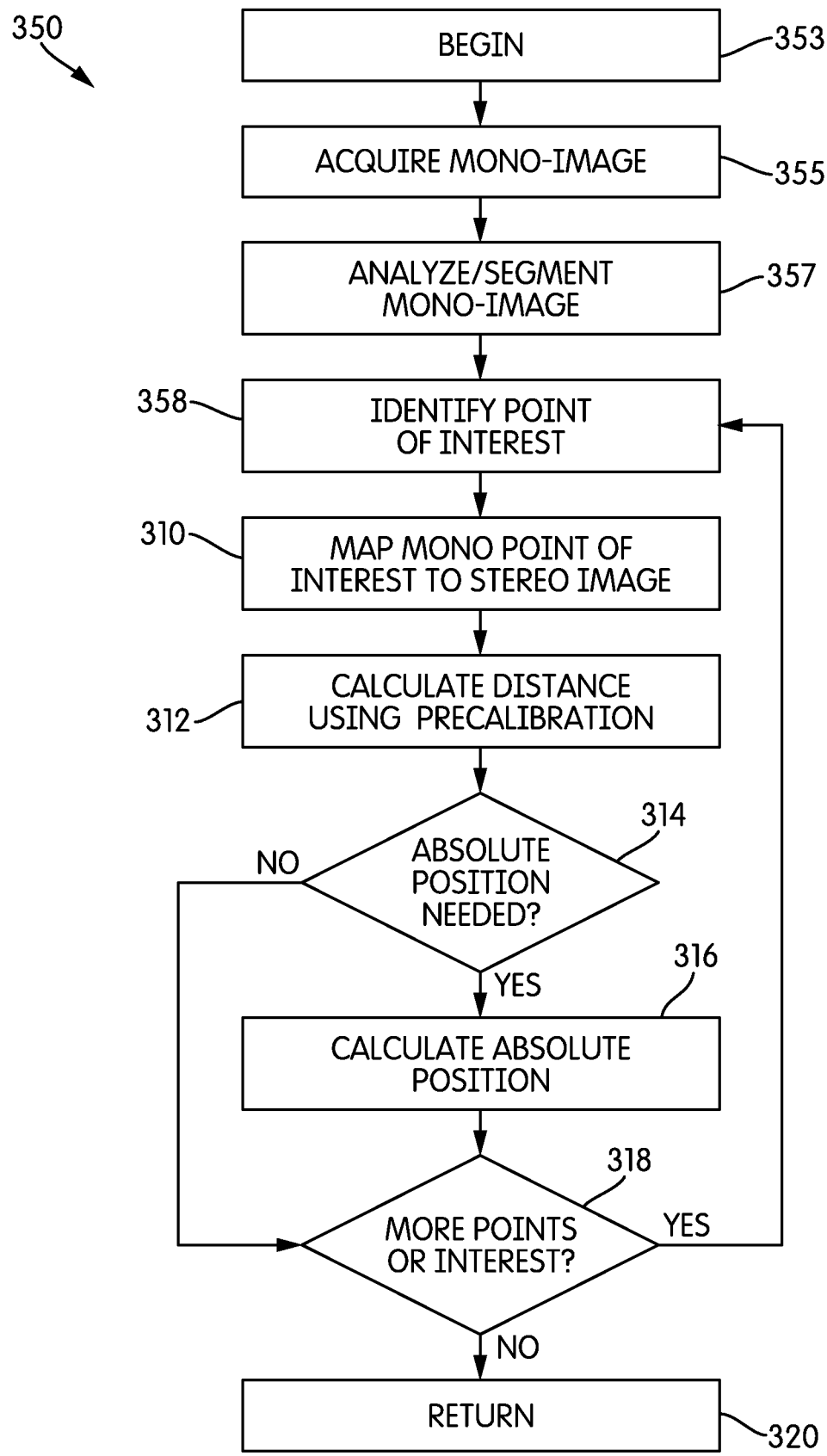
FIG. 13 is a flow diagram of a method for generating and analyzing overhead imagery for creating topographical maps, according to another embodiment of the invention.

While the measuring device itself may differ somewhat in form and in its electronics, method 300 would be executed in essentially the same way in many different embodiments, with some differences in how the point or points of interest are defined. For example, FIG. 13 is a flow diagram of a method, generally indicated at 350, for using a stereo-optical measuring device to provide ranging data for topographical mapping. Because methods 300 and 350 are fundamentally similar, tasks of method 350 that are fundamentally the same as those of method 300 are given the same reference numeral and are not described in depth below.

Method 350 begins at 353 and continues with task 355 in which a mono-image is acquired. In contrast to method 300 described above, in task 355, mono-images may be acquired automatically by the measuring device, each mono-image corresponding to a stereo image that is acquired immediately before or immediately after the mono-image, so that there is adequate correspondence between mono-images and stereo images. Method 350 continues with task 357.

Task 357 represents one of the more significant departures from method 300 described above. Although a user may manually select points of interest for topographical mapping purposes, method 350 represents an at least partially automated method for doing so—and in some cases, method 350 may be fully automated. In task 357, instead of causing or allowing a user to manually define points of interest using a touch screen 14 or another form of graphical user interface, the measuring device itself analyzes the image and selects the points of interest. screen 14 or another form of graphical user interface, the measuring device itself analyzes the image and selects the points of interest.

This image analysis task usually begins with some form of image segmentation. The image segmentation may be a rectilinear segmentation of the mono-image into quadrants (or smaller sections), or it may be based on edge detection or other common image analysis techniques. Method 350 continues with task 358, and points of interest are identified.

In task 358, in each segment of the image, the measuring device identifies one or more points of interest, typically along the edges or at the centroids of the image features. In some embodiments, points of interest may be chosen either randomly or in accordance with a histogram, a probability distribution, or other indicia of features of interest in the analyzed image. For example, an appropriately-trained neural network could be used to identify features of interest.

Once task 358 is complete, method 350 proceeds with tasks essentially identical to tasks 310-316 of method 300. The measuring device processes the points of interest, determines a physical distance to each point of interest and, if necessary, calculates the absolute position of each point of interest. In topographical mapping applications, absolute positions will typically be calculated. Method 350 continues, returning to task 358, until all points of interest have been ranged. The complete set of data can then be used to create topographical maps.

Another application for the apparatus and methods described above lies in determining the velocities, or at least, the speeds, of objects. Here, the two terms "speed" and "velocity" are used in the alternative. As those of skill will appreciate, a speed exists irrespective of its direction, whereas a velocity is a vector quantity that describes both a speed and a direction.

Figure 14:
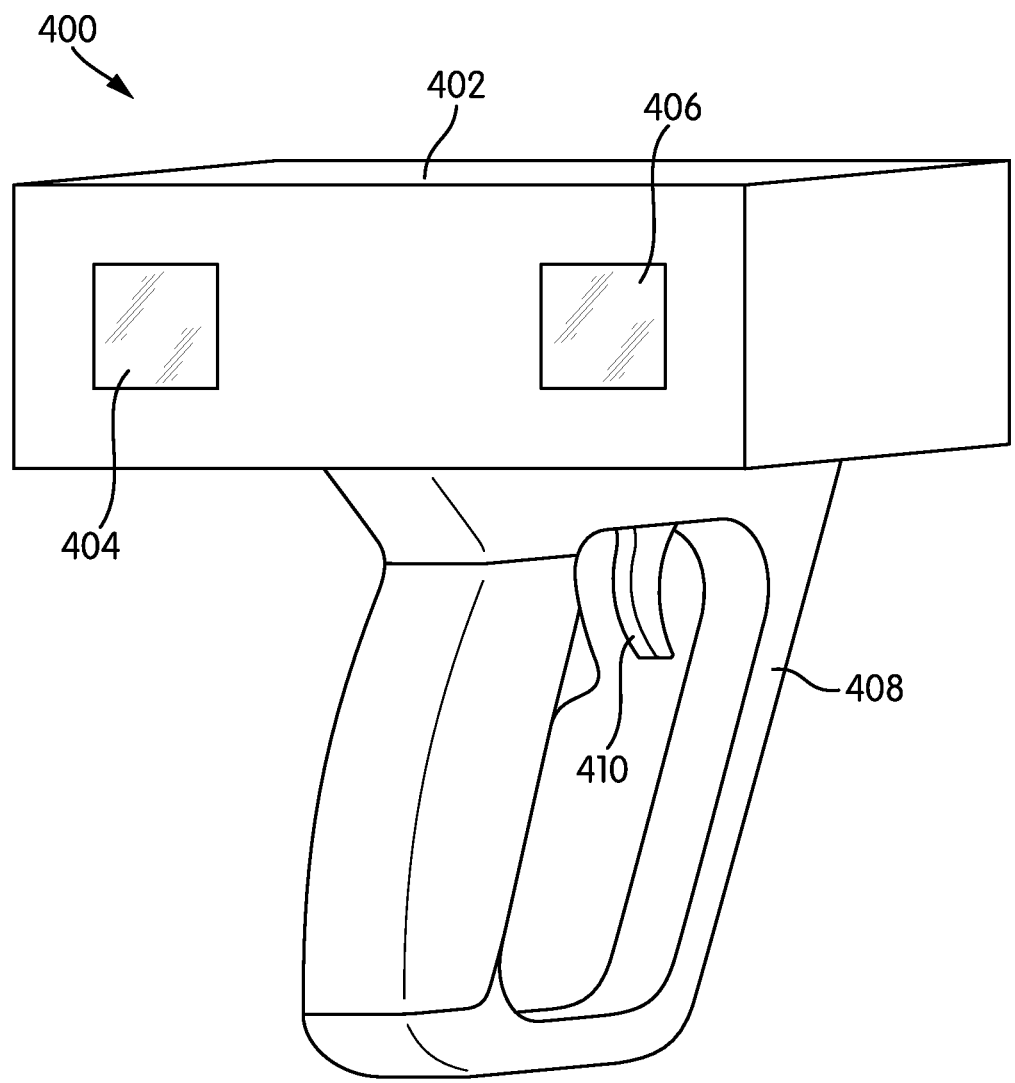
FIG. 14 is a front perspective view of an apparatus for determining the speed or velocity of a vehicle or object, according to another embodiment of the invention.

FIG. 14 is a front perspective view of a speed apparatus, generally indicated at 400. The speed apparatus 400 has the form of a "speed gun," meant to serve the same function as radar detectors used by police officers to determine the speeds of vehicles.

The speed apparatus 400 has an enclosure 402 which contains both the optical system and the digital sensor 60. The optical system may be any of the optical systems described above. The front of the enclosure 402 has dual optical windows 404, 406. The rear of the enclosure 402 has a digital viewscreen to display a stereo image, as well as a reticle 15, just as shown in FIG. 2. In this embodiment, the viewscreen may or may not be a touch screen.

Rather than providing input and identifying the point of interest (in this case, presumably the vehicle of interest) by tapping on a touch screen, the apparatus 400 has a pistol grip 408 with a trigger 410. To actuate the apparatus, the user would hold the pistol grip, point the reticle 15 at the vehicle of interest, and pull the trigger.

Figure 15:
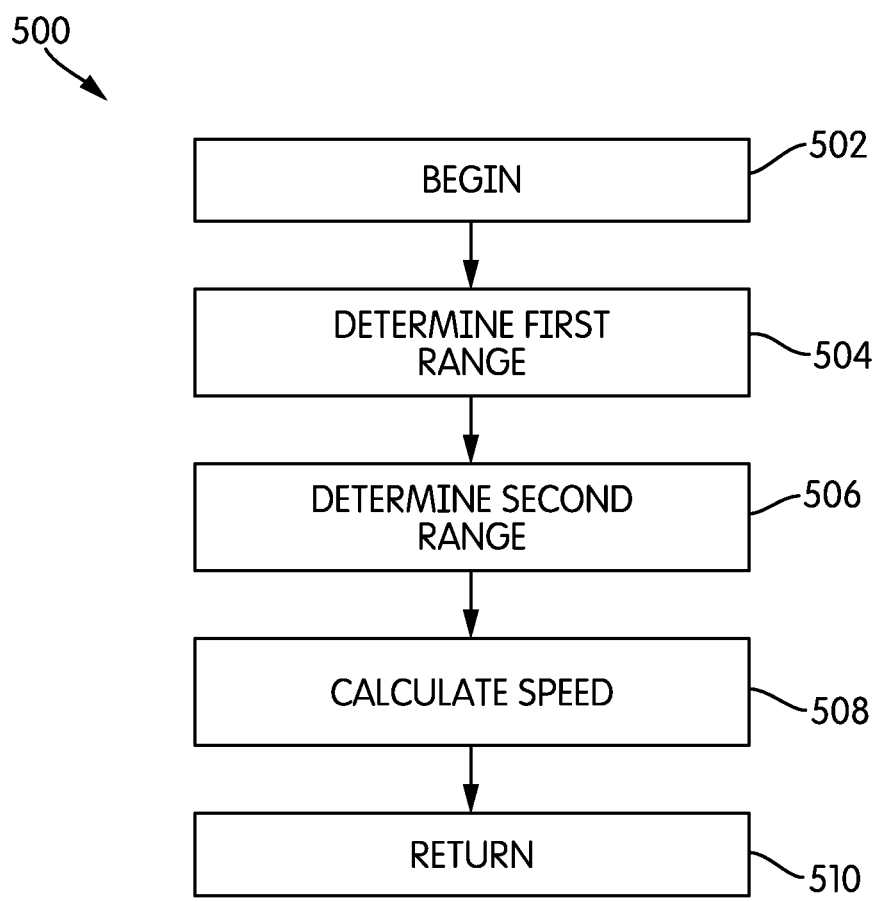
FIG. 15 is a flow diagram of a method for using the apparatus of FIG. 14.

A more specific method for using the apparatus 400 is shown in FIG. 15, a flow diagram of a method generally indicated at 500. Method 500 begins at 502 and continues with task 504. In task 504, a vehicle is located. This may be done manually by pointing the reticle 15 at a vehicle of interest or, as will be described below in more detail, it may be done automatically. In task 506, the user pulls the trigger 410 to calculate a first distance to the object or vehicle. Method 500 then continues with task 508, and a second range to the object or vehicle is determined. In practice, if the user keeps the trigger pulled and the reticle 15 pointed at the object or vehicle, the apparatus 400 may pause for some increment of time and automatically obtain a second range to the object or vehicle. Method 500 then continues with task 510, in which the two ranges are used to calculate a speed or velocity. This can be done in elementary fashion by taking the difference between the two calculated ranges and dividing it by the interval of time over which the two ranges were taken. Further conversions may be done to convert to a familiar set of units, such as miles per hour or kilometers per hour. Method 500 concludes at 512.

In most cases, only relative positions need be calculated in tasks 504 and 506 in order to perform task 508 and to determine a speed. If a velocity is needed, method 500 may also include the task of calculating an absolute position with each rangefinding operation. A velocity may then be established. In some cases, a simpler velocity vector may be established simply by noting whether the vehicle is moving toward or away from the device, i.e., whether its image is larger or smaller during task 506. A vehicle's vector may also be related to its compass direction of travel. Additionally, if needed for evidentiary or other purposes, the apparatus 400 may record the absolute position of the vehicle or object. The apparatus 400 may also record either mono or stereo images for evidentiary purposes.

As those of skill in the art will note, the above is a manual process for determining the speed or velocity of vehicles. However, the tasks that are described above as being manual in nature could be implemented automatically. For example, the apparatus 400 could have an automatic trigger in addition to or instead of the manual trigger 410. In task 504, a trained neural network could be used to identify all vehicles within the field of view of the apparatus 400, and tasks 506 and 508 could then establish speeds or velocities for every vehicle identified in task 504. In this case, the points of interest would be related to the objects detected in the field of view. For example, the apparatus 400 could track the centroid of the object or a particular point along its border. While this particular example deals with identifying and establishing the travel vectors of vehicles, the methods and apparatus described here could be applied in a range of applications.

While the invention has been described with respect to certain embodiments, the description is intended to be exemplary, rather than limiting. Modifications and changes may be made within the scope of the invention, which is defined by the appended claims.

What is claimed is:

1. A method of determining the range to or position of an object, comprising:
   acquiring a stereo image of a scene using a fixed-element stereo optical system;
   acquiring a mono-image of the scene;
   identifying a point of interest on the mono-image;
   mapping the point of interest to a point on the stereo image;
   determining an image distance between the point of interest and a stereo copy of the point of interest; and
   converting the image distance to a physical distance using a function-of-functions derived from pre-calibration empirical data, the empirical data function establishing a relationship between the image distance and the physical distance for a plurality of different lens focal lengths.

2. The method of claim 1, wherein said converting comprises converting the image distance to a physical distance using a non-trigonometric function-of-functions.

3. The method of claim 1, wherein said acquiring a mono-image comprises acquiring the mono-image using the fixed-element stereo optical system by closing one optical pathway of the fixed-element stereo optical system or using an image formed by only one optical pathway of the fixed-element stereo optical system.

4. The method of claim 1, wherein the fixed-element stereo optical system comprises two digital sensors.

5. The method of claim 4, further comprising using output from one of the two digital sensors to produce the mono-image while, in parallel, producing the stereo image using the two digital sensors.

6. The method of claim 1, wherein said determining the image distance comprises searching for the stereo copy of the point of interest in the stereo image.

7. The method of claim 6, wherein said searching comprises:
   defining a search template;
   advancing the search template linearly across the stereo image; and
   with each advance, comparing an image set of pixels with the search template to find a match.

8. The method of claim 1, further comprising converting the physical distance to an absolute position of the object at the point of interest.

9. A method for determining a speed of a moving object, comprising:
   determining a range of the moving object to a measuring device using the method of claim 1 at least twice over a period of time; and
   calculating the speed based on the ranges and the period of time.

10. A fixed-element optical measuring device, comprising:
    a first optical pathway including a first fixed optical element;
    a second optical pathway including a second fixed optical element;
    one or more digital sensors adapted to accept light from the first optical pathway and the second optical pathway to form a stereo image;
    a lens system with a plurality of focal lengths arranged in front of the one or more digital sensors; and
    a processing unit that converts an image distance between stereo copies of a point of interest in the stereo image to a physical distance to the measuring device using a function-of-functions constructed from pre-calibration empirical data that relates the image distance to the physical distance for each of the plurality of focal lengths.

11. The fixed-element optical measuring device of claim 10, wherein the one or more digital sensors comprise one digital sensor.

12. The fixed-element optical measuring device of claim 10, wherein the one or more digital sensors comprise two digital sensors, one of the two digital sensors in each of the first optical pathway and the second optical pathway.

13. The fixed-element optical measuring device of claim 10, wherein the digital viewfinder comprises a touch screen.

14. The fixed-element optical measuring device of claim 10, wherein the lens system is behind the first optical pathway and the second optical pathway.

15. The fixed-element optical measuring device of claim 10, wherein the lens system is in front of the first optical pathway and the second optical pathway.

16. The fixed-element optical measuring device of claim 10, wherein a present focal length of the plurality of focal lengths is communicated to the processing unit for the conversion of image distance to physical distance.

17. A method of generating elevational data for a topographical map, comprising:
    acquiring an overhead stereo image of an area using a fixed-element stereo optical system having a plurality of focal lengths;
    acquiring a mono-image of the area using the fixed-element stereo optical system;
    analyzing the mono-image to identify one or more points of interest for ranging; and
    for each of the points of interest
    mapping the point of interest to a point on the stereo image;
    determining an image distance between the point of interest and a stereo copy of the point of interest; and
    converting the image distance to a physical distance using a function-of-functions derived from pre-calibration empirical data, the empirical data function establishing a relationship between the image distance and the physical distance for a plurality of different lens focal lengths, including a focal length used in said acquiring.

18. The method of claim 16, wherein said analyzing is performed automatically by a computer system.

19. A method for determining the range to or position of an object, comprising:
- automatically identifying one or more points of interest in a digital stereo image acquired using a fixed-element digital-optical measuring device having a plurality of lens focal lengths;
- determining a distance to the one or more points of interest by measuring an image distance between stereo copies in the digital stereo image for each of the one or more points of interest and using a function-of-functions derived from pre-calibration empirical data to find the distance to each of the one or more points of interest, the empirical data function establishing a relationship between the image distance and the physical distance for a plurality of different lens focal lengths, including a lens focal length of the plurality of lens focal lengths that was used to acquire the digital stereo image.

20. The method of claim 19, wherein said automatically identifying comprises identifying objects in the digital stereo image using a trained neural network and selecting points related to the identified objects.

21. A method for determining a speed of a moving object, comprising:
- determining a range of the moving object to a measuring device using the method of claim 19 at least twice over a period of time; and
- calculating the speed based on the ranges and the period of time.

22. The method of claim 21, further comprising calculating a directional vector.

* * * * *